(12) United States Patent
Askelson et al.

(10) Patent No.: US 8,368,584 B2
(45) Date of Patent: Feb. 5, 2013

(54) AIRSPACE RISK MITIGATION SYSTEM

(75) Inventors: Mark Anthony Askelson, Thompson, ND (US); Benjamin M. Trapnell, Grand Forks, ND (US); Christopher Joseph Theisen, Thompson, ND (US); Ronald Arthur Marsh, Grand Forks, ND (US); Timothy Raymond Young, Grand Forks, ND (US); Hassan Reza, Grand Forks, ND (US)

(73) Assignee: The University of North Dakota, Grand Forks, ND (US)

( * ) Notice: Subject to any disclaimer, the term of this patent is extended or adjusted under 35 U.S.C. 154(b) by 186 days.

(21) Appl. No.: 12/813,276

(22) Filed: Jun. 10, 2010

(65) Prior Publication Data

US 2010/0315281 A1    Dec. 16, 2010

Related U.S. Application Data

(60) Provisional application No. 61/185,790, filed on Jun. 10, 2009.

(51) Int. Cl.
     *G01S 13/00*      (2006.01)
(52) U.S. Cl. .......................................... 342/30; 342/179
(58) Field of Classification Search .............. 342/29–32, 342/179
See application file for complete search history.

(56) References Cited

U.S. PATENT DOCUMENTS

| | | | |
|---|---|---|---|
| 6,211,808 B1 | 4/2001 | Rees | |
| 6,278,396 B1 | 8/2001 | Tran | |
| 6,456,941 B1 | 9/2002 | Gutierrez | |
| 7,269,513 B2 | 9/2007 | Herwitz | |
| 7,307,579 B2 | 12/2007 | Rees et al. | |
| 7,443,334 B2 | 10/2008 | Rees et al. | |
| 7,633,428 B1 * | 12/2009 | McCusker et al. | 342/26 B |
| 2007/0001051 A1 | 1/2007 | Rastegar et al. | |
| 2008/0055149 A1 | 3/2008 | Rees et al. | |
| 2008/0215204 A1 | 9/2008 | Roy et al. | |
| 2009/0102630 A1 * | 4/2009 | Nordlund | 340/436 |
| 2010/0121575 A1 * | 5/2010 | Aldridge et al. | 701/301 |

FOREIGN PATENT DOCUMENTS

EP      1 942 351 A1    7/2008
WO    WO 2008/153597 A1    12/2008

OTHER PUBLICATIONS

"DoD Adopts ASTM Int'l Sense-and-Avoid Standard for UAV Certifications", IHS, Jun. 23, 2005 at <http://aero-defense.ihs.com/news/2005/astm-airborne-sense-and-avoid-system.htm>.

* cited by examiner

Primary Examiner — Timothy A Brainard
(74) Attorney, Agent, or Firm — Kinney & Lange, P.A.

(57) ABSTRACT

An airspace risk mitigation system includes a plurality of airspace input sources, an airspace data fusion and sensor coordination system, a communications link, and a risk mitigation support system. The airspace input sources includes a radar for generating radar data for an airspace, and an Automatic Dependent Surveillance-Broadcast (ADS-B) receiver for generating additional data for the airspace. The airspace data fusion and sensor coordination system is configured to receive airspace data from the plurality of airspace input sources, correlating airspace data with new or known objects in the airspace, fusing airspace data into a common airspace data set, and generating target and system status information. The risk mitigation support system is configured to calculate a risk associated with aircraft operation in the airspace as a function of the target and system status information.

16 Claims, 10 Drawing Sheets

AIRSPACE RISK MITIGATION SYSTEM

CROSS-REFERENCE TO RELATED APPLICATION(S)

This application claims priority to U.S. Provisional Patent Application Ser. No. 61/185,790, entitled "Airspace Risk Mitigation System," filed Jun. 10, 2009, which is hereby incorporated by reference in its entirety.

STATEMENT OF GOVERNMENT INTEREST

The present invention was developed, at least in part, with U.S. Government funding pursuant to Department of Defense contract Nos. FA4861-06-R-C006 and FA4861-07-R-C003. The U.S. Government has certain rights in this invention.

BACKGROUND

Conducting flight operations of any kind in airspace where aircraft not under one's direct control or where communications between such aircraft do not exist can be considered dangerous. Such situations may occur when unusual operations of aerostats (tethered balloons), unmanned aircraft, rockets or other aerial vehicles are flown in unrestricted airspace. For example, after a severe weather incident, flight of manned or unmanned aircraft is desired to examine the extent of possible damage to personnel or property on the ground. Because of the weather event, normal air traffic control services, which might have provided a risk mitigation strategy, are not available. Additionally, in the attempt to provide the greatest level of information dissemination, the area might not be restricted to media or other disaster relief aircraft. A system that would allow such activities to take place, while maintaining a high level of safety, would be invaluable to disaster relief agencies or others needing to conduct such operations.

In particular, the rapid development of Unmanned Aircraft Systems (UAS) in the United States and worldwide has generated investment in research, technologies, and systems at an unprecedented rate. The proven successes of Unmanned Aircraft (UA) in military environments and rapid advances in commercial navigation, automation, and sensing technologies have created new opportunities for civilian applications discussed in the preceding paragraph, of UAS. These opportunities have in turn imposed ever-increasing pressure on the Federal Aviation Administration (FAA) to respond with certification standards and regulations that will allow UA access to the National Airspace System (NAS) even in times of emergency. These standards and regulations, by necessity, will apply to all UAS operators.

Overshadowing all areas of this regulatory effort is the FAA's mandate to quantify and achieve a target level of safety that is consistent with the current level of safety of manned aircraft with respect to ground fatalities and mid-air collisions. As a risk mitigation strategy, it can be difficult to perform certain aviation operations and maintain that level of safety. "An equivalent level of safety" is a term heard often today. It implies that, in part, any system or operation that effectively replaces a particular capability of the pilots left on the ground, especially their ability to "see and avoid" other aircraft—must be as good or better than the pilot it replaces.

For Unmanned Aircraft (UA) operations (but it could apply to any operation that makes it more difficult to see and avoid other aircraft), FAA policy memo 08-01 gives Military, Public, and Private operators of Unmanned Aircraft Systems guidance on how operations are to take place and what approaches are allowed for Sense and Avoid (SAA). When unable to comply with Title 14 of the Code of Federal Regulations part 91.111 and 91.113, the operator may use alternative risk-mitigation strategies such as observers on the ground provided the UA is flown below three thousand feet above the ground (AGL) and within one mile laterally. If the UA is to be flown higher or farther from the observer, the UA must be chased by aircraft with an on-board observer. If the UA is flown in restricted airspace, however, no specific means of SAA is needed due to the nature of the airspace.

Although most UA will be equipped with GPS-based technologies, such as Automatic Dependent Surveillance-Broadcast (ADS-B) or other standard navigational aides, such technology cannot be assumed to be in place on other aircraft operating in the same airspace as the UA. This argues for the need for additional non-line-of-sight methods for monitoring the complete airspace desired for UAS deployment.

Operationally, radar systems have been used for the detection and deconfliction of aircraft for over fifty years. Recent advances in radar technology, along with corresponding advances in communications, computing, and data processing, now provide the capability for unprecedented real-time surveillance of large volumes of the atmosphere.

SUMMARY

Generally, the present invention is directed towards enabling the operation of any craft in a localized area of the NAS through the development of a Ganged Phased Array Radar Risk Mitigation System (GPAR-RMS). This system is capable of sensing all cooperative and un-cooperative aircraft sufficiently to determine their positions and analyze the risk of introducing another target into the given airspace. When small UA, those without ADS-B transponders, are deployed the system of the present invention is also capable of directly notifying manned ADS-B equipped aircraft of the UA's position via an ADS-B broadcast from the UA Ground Control Station (GCS). This Risk Mitigation System (RMS) will permit a high-degree of situational awareness, collaboration between a broad array of users, and a method to link information systems and users together in an efficient and effective manner. Such a system will provide for effective decision-making regarding the safety of such operation.

The system described herein is not a ground-based sense and avoid system (SAA). The U.S. Federal Aviation Administration has implicitly relied on the eyesight of human pilots as the "last chance" SAA means to avoid midair collisions when radar coverage is absent or transponders are inoperable or not installed. "DoD Adopts ASTM Intl Sense-and-Avoid Standard For UAV Certifications", IHS, 23 June 2005 at <http://aero-defense.ihs.com/news/2005/astm-airborne-sense-and-avoid-system.htm>. However, systems, such as the Traffic Collision Avoidance System (TCAS), are also used to perform SAA. A SAA system must be capable of sensing the close proximity of, and impending collision with, another aircraft. It must then provide an automated maneuver command to the aircraft that will cause it to avoid the impending mid-air collision. The "Standard Specification for Design and Performance of an Airborne Sense-and-Avoid System" was developed by ASTM International's F38 Committee on Unmanned Aircraft Systems. As stated by ASTM International, automating SAA is the key technical hurdle precluding unmanned aviation operating on an equal footing with manned aircraft. "DoD Adopts ASTM Intl Sense-and-Avoid Standard For UAV Certifications", IHS, 23 June 2005, at <http://aero-defense.ihs.com/news/2005/astm-airborne-sense-and-avoid-system.htm>. The system described herein is not an SAA system. Rather, it is a risk mitigation system that provides aircraft identification and deconfliction well before aircraft get close enough for SAA to be required.

The FAA has determined that UA are aircraft. They have noted that there is no distinction between unmanned aircraft and any other aircraft from a regulatory standpoint. The only disconnect is the location of the pilot of the unmanned aircraft. The rules governing the aviation community apply as well to the unmanned aircraft community. With this distinction, it is wise to note that tracking and providing deconfliction of aircraft with radar is a technique developed in the 1930's. In 1946, the Civil Aviation Authority (CAA) unveiled an experimental radar-equipped tower for control of civilian flights. By 1952, the CAA had begun its first routine use of radar for approach and departure control.

More specifically, the use of phased array radars for such purposes was begun in the 1960's. The use of radars to detect other targets (e.g., balloons, birds, parachutists, etc.) within the atmosphere is no different than previous uses to detect aircraft. The radars are able to determine the location of the target relative to the radar, which can then be easily converted into a latitude, longitude, and altitude location through the use of Great Circle Equations and spherical trigonometry.

During this same period of time, the FAA began successful testing of a system under which flights in certain "positive control" areas were required to carry a radar beacon, called a transponder, which, when linked to a specific radar return, identified the aircraft and helped to improve radar performance. Displaying and tracking aircraft and other airspace is commonly done as part of today's Air Traffic Control environment.

The GPAR-RMS, however, differs from all others as it is designed with multiple radars observing a common airspace. Each radar has its own display supplied by the manufacturer(s). This display, generally, is too simplistic for the use in an application as described herein. The multiple radar data in the GPAR-RMS are combined with other sources of information regarding target position (e.g., GPS, ADS-B, etc.). This information is then passed to multiple displays. Each display is tailored to meet the requirements for a specific component of the GPAR-RMS.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale.

DETAILED DESCRIPTION

In general, the present invention is an airspace risk mitigation system that integrates aircraft position data from a plethora of sources such as Automatic Dependent Surveillance-Broadcast (ADS-B), one or more ground based radars, and telemetry data from Global Positioning System (GPS) equipped aircraft and displays said data on one or more display systems. The present invention includes a Risk Mitigation Support System that analyzes air traffic trajectories and performs risk assessment on the airspace and a Data Manager that combines the disparate data and multicasts the data to a high resolution Range Control Center Information Display System (RCCIDS) and any number of high resolution Ground Observer Information Display Systems (GOIDS). The RCCIDS provides information to a Range Control Operator, whose responsibility is the overall safety of the airspace. The GOIDS provides information to the ground-based observer, who fulfills the same aircraft deconfliction role as visual-line-of-sight ground-based observers do under current FAA unmanned aircraft (UA) regulations. In one embodiment, the present invention can also acquire UA position information from the UA GCS and feed that information into the system's ADS-B transponder for broadcast (e.g., broadcast into the airspace). Thus, in a sense, the present invention can "spoof" the ADS-B transponder into thinking it is onboard the UA when it is not. The system provides a mechanism for the identification and mitigation of the risks involved when a multitude of aircraft types are operated in a common airspace.

Figure 1:
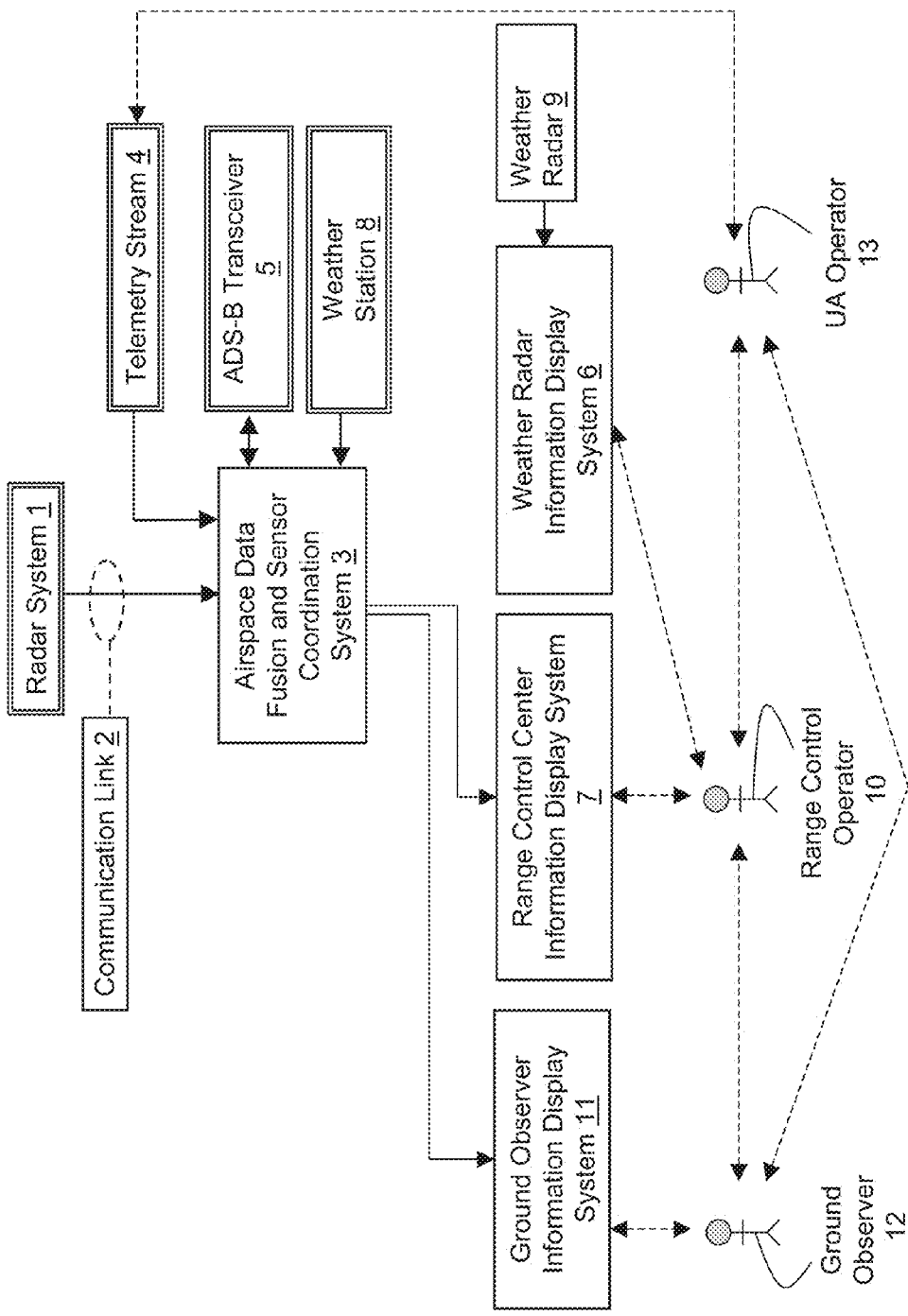
FIG. 1 is a block diagram of an airspace risk mitigation system according to the present invention.

As shown in FIG. 1, the present invention provides an airspace risk mitigation system that employs an Airspace Data Fusion and Sensor Coordination System 3 to integrate aircraft position (latitude, longitude, and altitude) data from a plethora of sources such as ground based Radar Systems 1, Telemetry Streams 4 from a global positioning system (GPS) equipped aircraft, and aircraft equipped with an Automatic Dependent Surveillance-Broadcast (ADS-B) receiver 5. The system further employs a Weather Station 8 and a Weather Radar 9 source such that up-to-date weather information is acquired, a Weather Radar Information Display System 6 and a Range Control Center Information Display System 7 to provide the Range Control Operator 10 with a concise view of the airspace and weather, and one, or more, Ground Observer Information Display System(s) 11 to provide one or more Ground Observers 12 with a concise view of the airspace relevant to their operations. Commercial off-the-shelf voice communications between the Range Control Operator 10, Ground Observer 12, and UA Operator 13, illustrated as dashed lines, provide a mechanism for airspace risk mitigation. It should be noted that these communications can be of the same nature as that provided by Air Traffic Control (ATC) in the National Airspace (NAS).

Figure 2:
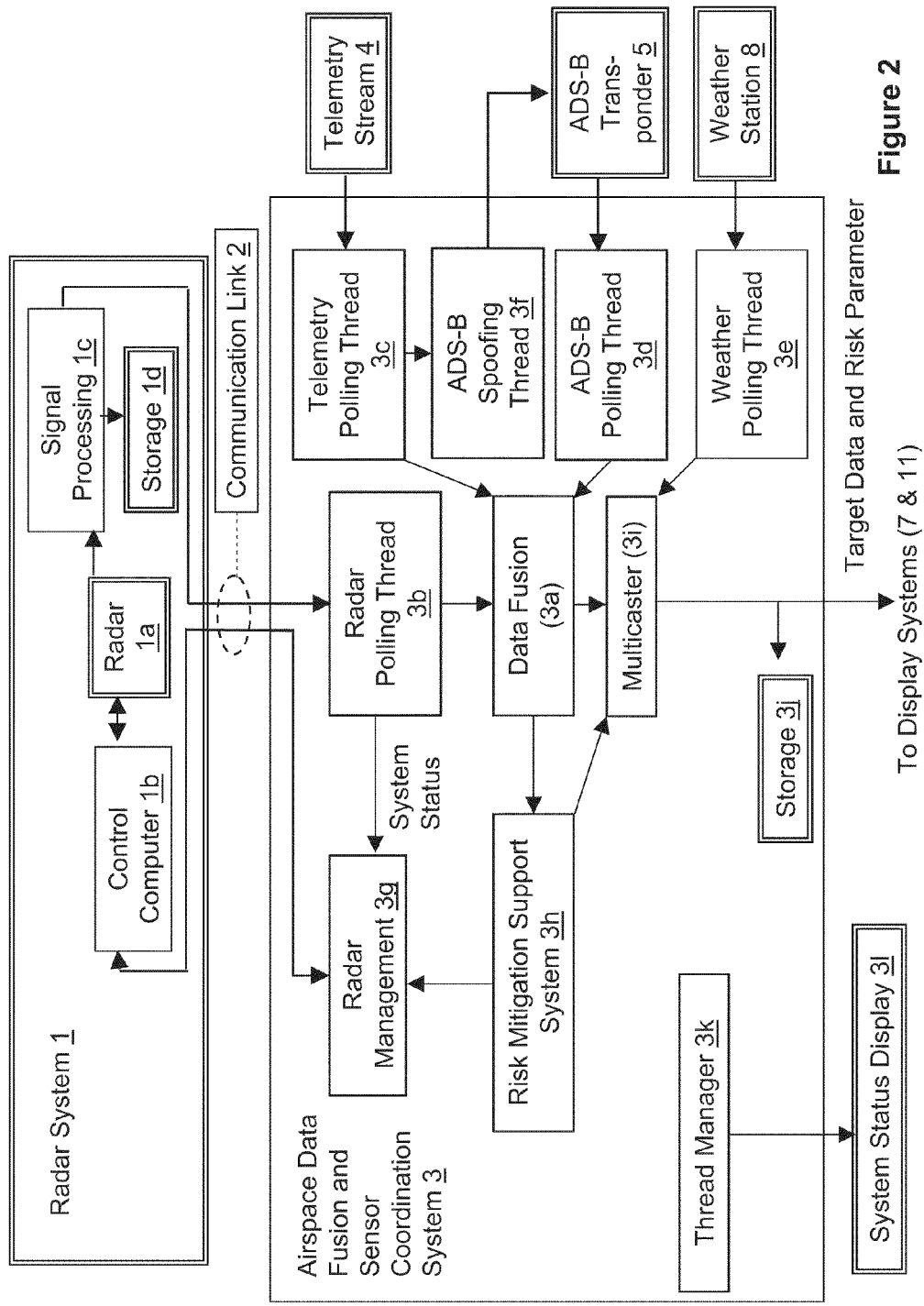
FIG. 2 is a block diagram of a portion of the airspace risk mitigation system.

As shown in FIG. 2, each Radar System 1 (for simplicity, only one is illustrated) includes a Radar 1a as supplied by a radar manufacturer (e.g., antenna, transmitter, receiver, software to produce radar products, radar housing equipment, and necessary connecting resources), a Radar Control Computer 1b (which may or may not be supplied as part of the manufacturer's radar system) that is used for controlling each Radar 1a, Data Signal Processing component 1c that is separate from the manufacturer-supplied system and that is used to post-process radar data, and a commercial-off-the-shelf media storage device 1d. The Data Signal Processing component 1c can be located on the Radar Control Computer 1b or on a separate computer (as shown). The Data Signal Processing component 1c sends the raw data to Storage 1d and prepares the data for data transfer via a Communications Link 2 to the Airspace Data Fusion and Sensor Coordination System 3. The Storage 1d can be any suitable storage means readable by computer or other means.

The Radar Control Computer 1b is configured to supply commands to the Radar 1a, such as starting and stopping scans and instructing the Radar 1a to change scan strategies. The Radar Control Computer 1b can be remotely accessed from the Airspace Data Fusion and Sensor Coordination System 3 through the two-way Communications Link 2. The Radar 1a supplied by the manufacturer may also provide some data processing capabilities. However, the risk mitigation system requires a second Data Signal Processing component 1c connected to the Radar 1a to perform additional post-processing of radar data, which includes detection of potential targets, preparation/compression of weather radar data (if available), and storage of raw radar data in Storage 1d. This component maybe integrated with the Radar Control Computer 1a (if capable) or can be a separate system (as shown). Post-processing is required to reduce the amount of information sent across the Communication Link 2 to the Airspace Data Fusion and Sensor Coordination System 3. In the preferred embodiment, the Communications Link 2 can be a commercial off-the-shelf full duplex communication system providing two-way communications between the Airspace Data Fusion and Sensor Coordination System 3 and each Radar System 1. Depending on the specifics of the installation, the Communications Link 2 can be a land-based communication system, such as Ethernet, or an equivalent wireless system. It is assumed that all radar system components can receive power through a generator or a local power grid (not shown).

The Airspace Data Fusion and Sensor Coordination System 3 is a multithreaded software system that includes multiple threads (such as a Radar Polling Thread 3b, Telemetry Polling Thread 3c, ADS-B Polling Thread 3d, and a Weather Polling Thread 3e) for monitoring the connected sensors, a Data Fusion 3a thread to combine the sensor data into a single datum, an ADS-B Spoofing Thread 3f, a Radar Management 3g thread, a Risk Mitigation Support System 3h thread, a Multicaster 3i thread, and a Storage 3j device. The Airspace Data Fusion and Sensor Coordination System 3 also includes a Thread Manager 3k for monitoring system status and providing an output to a System Status Display 3l.

The Data Fusion 3a thread utilizes inputs of airspace data (airborne object locations) from several sources, including the Radar System(s) 1, an ADS-B transponder 5, and optional Telemetry Streams 4 for monitoring telemetry-reporting-equipped target positions, such as balloons, rockets, airplanes, and UA. The individual polling threads use different techniques to monitor their respective sensors as the sensors have different types of hardware interfaces. The Radar Polling Thread 3b uses a BSD-style socket to receive airborne-object positional data and radar system status information via the Communications Link 2 from the Radar System 1. As data are collected they are stored in a local queue (not shown). The Telemetry Polling Thread 3c uses a BSD-style socket to receive object positional data from airborne objects that are equipped with telemetry-reporting equipment. This includes objects such as balloons, rockets, airplanes, and UA that have the ability to transmit their location either through ground control stations and/or onboard transmitting devices, such as a GPS transmitter. The data are then stored in another local queue. The ADS-B Polling Thread 3d uses a serial port to receive object positional data from airborne objects that are equipped with an ADS-B transceiver. The data are then stored in another local queue. The queued data are then used by the Data Fusion 3a thread which fuses the information into one common airspace picture. The Data Fusion 3a thread correlates incoming object data to other known objects. After an algorithm determines a match with a known object (or that the incoming target data is associated with a new object), the new information is fused with the previous information from other sensors collected on that matched target. If there is no known object that highly correlates with the incoming object information, the incoming object information is considered to be from a new object and is added to the list of known targets. As the data is fused it is passed to the Multicaster 3i thread via a queue for dissemination. The above describes one embodiment; however, alternative embodiments are possible, as will be appreciated by those of ordinary skill in the art.

The Airspace Data Fusion and Sensor Coordination System 3 also includes a mechanism for "spoofing" the ADS-B transponder into thinking it is on-board the UA. This is particularly useful when the UA, for whatever reason, cannot carry its own ADS-B unit. The ADS-B Spoofing Thread 3f receives UA telemetry data from the Telemetry Polling Thread 3c and sends that data to an ADS-B Transponder 5, where the data are broadcasted to indicate the actual location of the UA. As long as the UA doesn't go "lost-link" and remains within line of sight of the GCS, this mechanism allows the UA to act as a cooperative aircraft without the weight and power penalty of physically carrying an ADS-B unit. Thus, in some embodiments the system of the present invention can operate with a UA that does not physically carry an ADS-B unit.

One embodiment of this "spoofing" mechanism extracts the required positional data from the Telemetry Polling Thread 3c output stream and reformats it into another output format, such as that used by an ARINC 743A positional sensor. These data packets are then transmitted out a serial port and into, for example, a RS-232 to ARINC 429 converter unit. The resulting ARINC 429 stream can then be fed into an ARINC 429 input port on a Garmin GDL 90 ADS-B unit (ADS-B transponder 5). The GDL 90 can be programmed to ignore its internal WAAS GPS receiver and use only the ARINC 743A positional information being fed from the computer. The GDL 90 unit then operates in its normal capacity as an ADS-B transceiver, except that it broadcasts the position of the UA itself, while remaining on the ground in the GCS (i.e., remote from the UA). The above describes one embodiment; however, alternative embodiments are possible, as will be appreciated by those of ordinary skill in the art.

The Weather Polling Thread 3e monitors a serial port to receive weather information (temperature, air pressure, wind speed and direction, etc.) from a commercial-of-the-shelf Weather Station 8 co-located with the Range Control Center. As data are collected they are stored in a local queue (not shown) and passed to the Multicaster 3i thread for dissemination.

The Radar Management 3g thread receives system status information about the Radar System(s) 1 from the Radar Polling Thread 3b and risk information from the Risk Mitigation Support System 3h. The Radar management 3g system continuously monitors the status of the individual Radar Systems 1 and overall airspace risk, produces a health parameter (radar transmitter status, radar receiver status, and radar beam steering status) for each Radar 1a, has an interface to remotely control each Radar 1a through the Communications Link 2 (to be used if human intervention is available and desired), and includes a decision support system for providing automatic alterations of radar scanning strategies. If one or more Radar System 1 were to stop operating, the decision support system adjusts the scanning strategies of the remaining Radars 1a (if needed) to ensure complete coverage of the airspace and to optimize the revisit time to ensure accurate tracking of targets. If the air traffic density results in an elevated risk in a region of the monitored air space, the decision support system will automatically task one of the radars to scan that region more intensely (either finer spatial resolution or smaller revisit time or both). The above describes one embodiment; however, alternative embodiments are possible, as will be appreciated by those of ordinary skill in the art.

Figure 3:
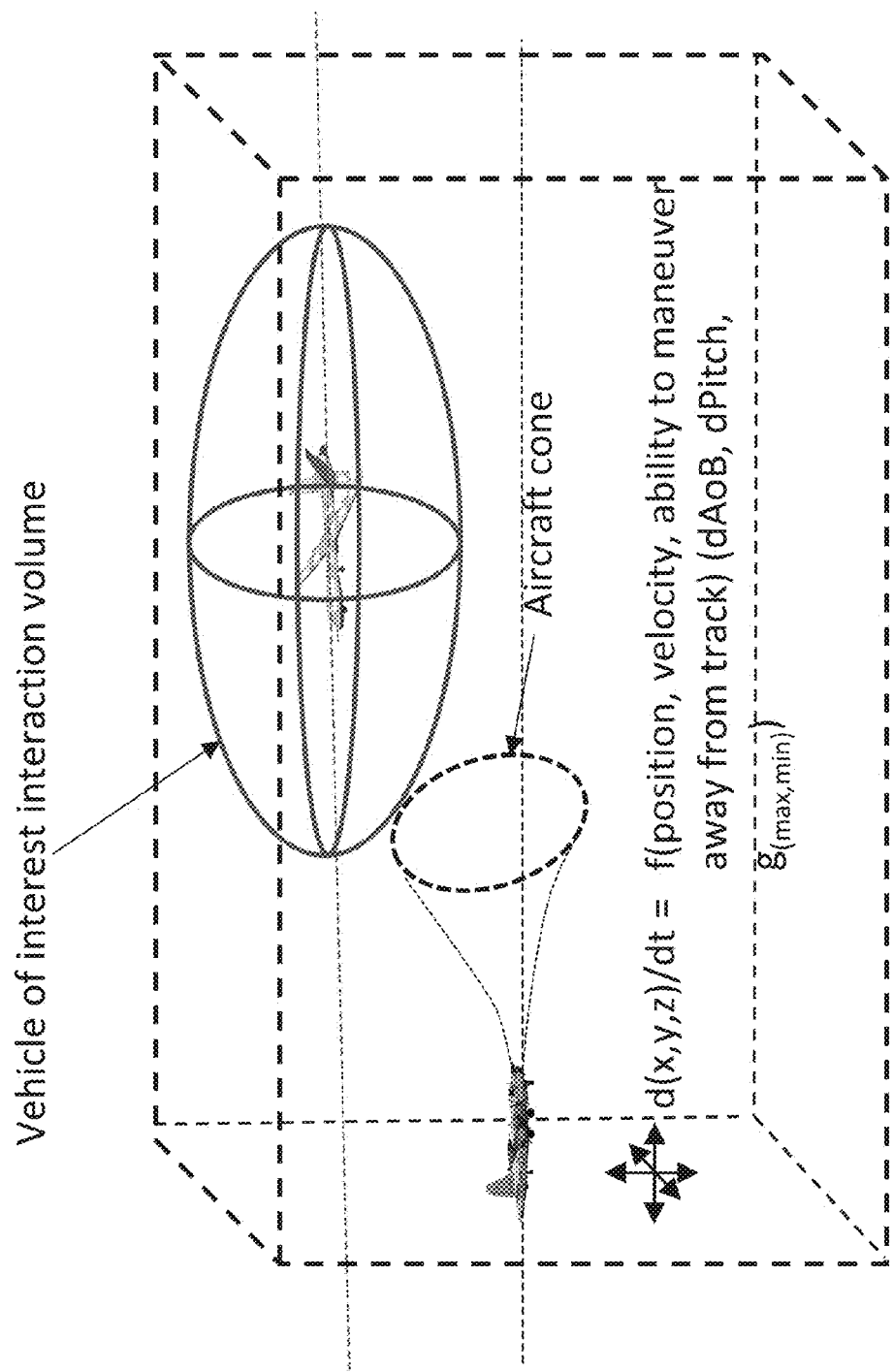
FIG. 3 is a schematic illustration of parameters considered in an aircraft interaction scenario within a risk mitigation support system of the airspace risk mitigation system.

The Risk Mitigation Support System 3h is a software thread that determines the risk associated with operating in the current airspace. As shown in FIG. 3, a moving aircraft is constrained by parameters that govern the maneuverability of a set of aircraft to be determined. Maneuverability limitations include limits to pitch and banked turns associated with aircraft flight. Constraints on pitch will include +/- 1g achieving 2g for upward motion and down to 0 g for downward motion, corresponding roughly to 60 degrees up or down. Constraints on banking motion will be governed by the radius of the turn r, velocity (true airspeed) v, gravity g, and the angle of bank, θ, related by equation (1):

$$r = \frac{v^2}{g \tan\theta} \quad (1)$$

The angle of bank is determined by the load factor n, the ratio between the lift on the aircraft and the weight of the aircraft related by the equation (2):

$$n = \frac{1}{\cos\theta} \quad (2)$$

Because the vehicle of interest has a known flight path, its interaction volume is a product of the cross sectional area and the aircraft speed and direction. For demonstrative purposes, the interaction volume of the vehicle of interest is shown in FIG. 3 as a 3D ellipse. Because the flight path of any manned aircraft operating in the airspace will have an unknown flight path (they are not under our control) its potential path (interaction volume) is modeled as a 3D cone-like shape extending from the aircraft. For demonstrative purposes, the interaction volume of the manned aircraft in the airspace is shown in FIG. 3 as a 3D cone. The actual shape of the cone-like volume is determined by the expected maneuverability limitations, as defined above, of aircraft operating in the specific airspace. Thus, different airspaces could have significantly different cones associated with each aircraft (due to FAA flight restrictions as well as aircraft performance characteristics). Additionally, the cone is segmented into velocity-determined sections that result in possible distances the aircraft will be located at a future time. The possibility of an interaction of the two aircraft is determined by the overlap of the cross sectional areas.

Because there is no contact or communication with any manned aircraft operating on our area, it is assumed that the manned aircraft's path is non-deterministic as the possible paths through the cone-like volume have widely differing probabilities of occurrence. For example, in order for an aircraft to follow a path near the edge it would have to operate near the limits of its maneuverability; a rather unlikely occurrence. While following a path through the center represents straight and level flight, a rather likely occurrence. Thus, the probability of interaction is determined by a constrained random walk based on numerical techniques. This is similar to widely used Monte Carlo methods for describing physical phenomenon. The simulation determines the probability of an interaction at any instantaneous time as the ratio of the number of interactions with the number of total number of random paths through the cube.

In only the simplest, least populated airspaces could a brute-force Monte Carlo simulation provide near real-time results on currently available computing hardware. Thus, some embodiments employ techniques to reduce the computations/data into a fast, reliable formula or set of formulae. Two methods are developed: (1) Probability Formula and (2) Table Interpolation. The 'probability' formula is used to determine a probability of interaction based on the time dependent data from real airborne objects. The formula can give a result immediately, which is desired in real time situations. The Probability Formula is derived from the Monte Carlo simulation using millions of aircraft paths through the cube. The result is a probability as a function of discrete variables. A fitting program is used to represent the discrete data into a smoothly varying function. In real time situations the ensuing aircraft will enter into the critical area around the target with a heading and speed. These data can then be fed into the Monte Carlo derived formula and a probability of interaction can then immediately be determined. A second method involves interpolation of data tables determined from the output of the Monte Carlo calculations. Given input variables the interpolation code can determine the correct table and produce a probability of interaction. The scalability of data coming from the Monte Carlo simulation allows updated distance information to be recalculated as a new probability of interaction. For example, if a new aircraft enters the airspace of the aircraft of interest and is determined to be closer than 50 miles the simulation data can be scaled to match the new information and a new probability can be determined. This is done with an interpolation formula of the data using tabulated data from the Monte Carlo simulations.

To summarize, the risk calculation is based on three sources 1) Data Accuracy, 2) Weather, and 3) Airborne Objects (Monte Carlo Simulation). Data accuracy is determined by the errors associated with each input location parameter provided by the Airspace Data Fusion and Sensor Coordination System 3. The data accuracy inclusion will manifest itself as increasing or decreasing the location error associated with weather conditions or airborne objects resulting in a higher or lower probability of interaction, respectively. The data accuracy is scaled to 1.0 for optimum working conditions. Any source of non-optimal operating circumstances (e.g., loss of a radar) will increase the scale factor. For example, an increased location error (increased scale factor multiplier) would result in a larger 3-D cone with velocity contours that are spaced further out, indicating a higher chance of interaction. Weather conditions will be treated as an airborne object, for example a storm that is approaching will be treated as a slow moving aircraft. Interaction with the storm will be treated with the same interaction probabilities as a regular aircraft. The total probability of interaction will be determined by that which is the greater of the two, the Monte Carlo simulation or the current weather conditions, both of which have already taken into account the data accuracy. The above describes one embodiment; however, alternative embodiments are possible, as will be appreciated by those of ordinary skill in the art.

Once the risk associated with operating in the current airspace (risk parameter) is derived, the Risk Mitigation Support System 3h passes this information to the Multicaster 3i for transmission over a local area network (LAN) or other data transfer means to the Range Control Center Information Display System (RCCIDS) 7 and Ground Observer Information Display System (GOIDS) 11.

The Multicaster 3i thread monitors the queue connecting it to the Data Fusion 3a thread, the queue connecting it to the Weather Polling Thread 3e, and a shared memory space connecting it to the Risk Mitigation Support System 3h. As the data is collected it is stored in a local buffer (not shown). Once the buffer is filled, the Multicaster 3i thread calculates a checksum value and multicasts the contents of the buffer over a local area network (LAN). In addition to multicasting the data over the LAN, the data are also recorded on a Storage device 3j such as a hard drive. The above describes one embodiment; however, alternative embodiments are possible, as will be appreciated by those of ordinary skill in the art.

Figure 4:
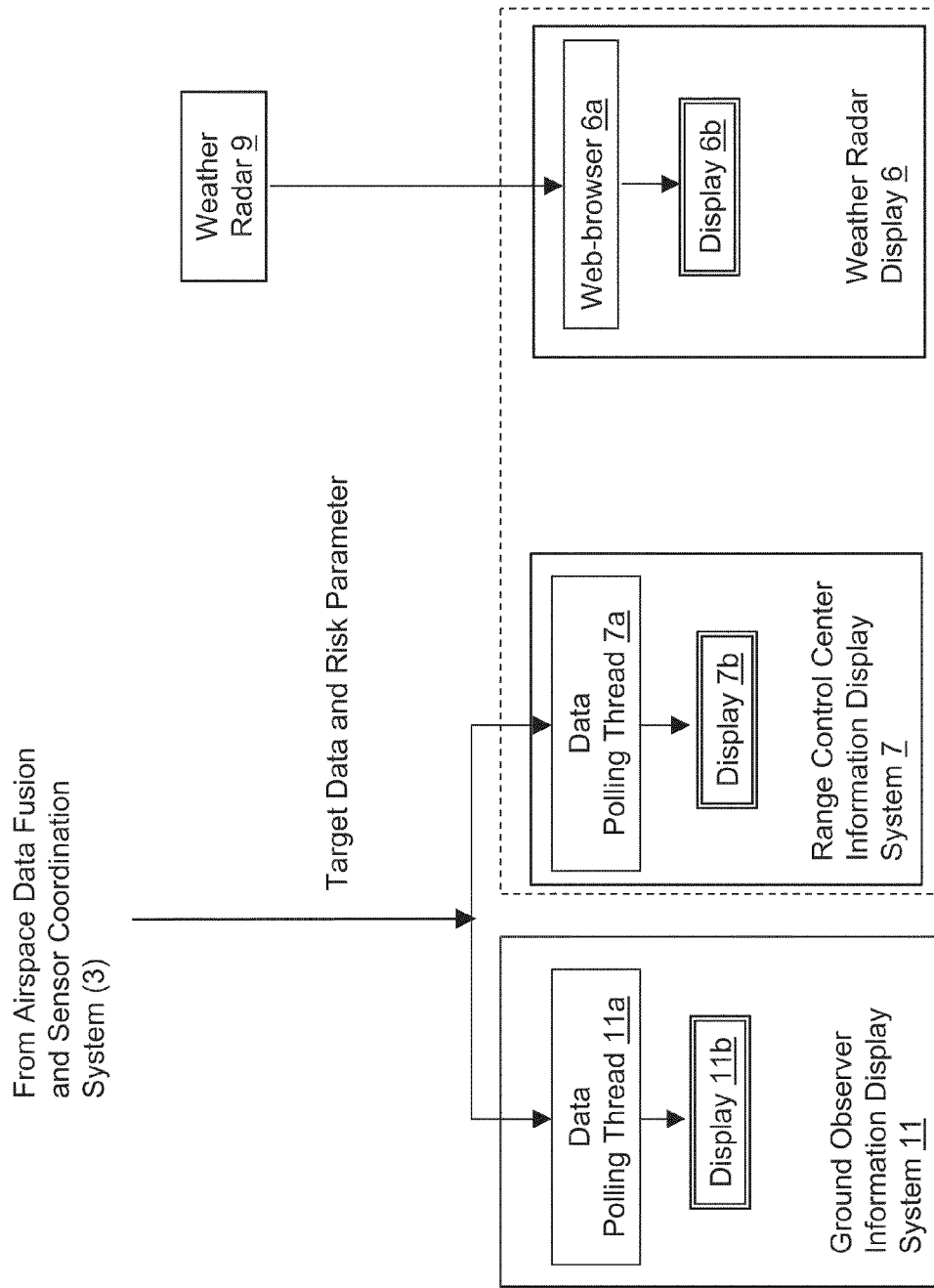
FIG. 4 is a block diagram of another portion of the airspace risk mitigation system, illustrating Information Display Systems and their interconnections to an Airspace Data Fusion and Sensor Coordination System.

The Airspace Data Fusion and Sensor Coordination System 3 also includes a Thread Manager 3k and a System Status Display 3l (prototype shown in FIG. 4). Because the Airspace Data Fusion and Sensor Coordination System 3 is a multi-threaded system, a simple method to manage the state of the individual threads is to create a "Thread Manager" and have it act as the "main" program spawning all threads and monitoring their state. Should any thread fail to provide a "heartbeat" as expected for that thread, that failed thread is forcibly terminated and both ends of any associated queues are closed. The (failed) thread is then respawned and the associated queues reattached. The System Status Display 3l continually provides graphical feedback to the Range Control Operator 10 regarding the state of the overall Airspace Data Fusion and Sensor Coordination System 3.

One embodiment of the System Status Display 3l uses OpenGL and a 24 inch wide high resolution monitor; however, any graphics API (e.g., Direct X, etc) and/or any type of computer or display can be used.

FIG. 4 illustrates a Weather Radar Display 6, a Range Control Center Information Display System (RCCIDS) 7, and a Ground Observer Information Display System (GOIDS) 11. The RCCIDS 7 monitors the multicast output stream produced by the Airspace Data Fusion and Sensor Coordination System 3 and presents relevant airspace information to the Range Control Operator 10. The RCCIDS 7 and GOIDS 11 are the two Information Display Systems (IDSs) that work with the components shown in FIG. 2 (for instance, target data and risk parameter information from the multicaster 3i is sent to the RCCIDS 7 and GOIDS 11). The RCCIDS 7 comprises two independent software-subcomponents, a Weather Radar Display 6 and the RCCIDS 7. In one embodiment, both software-subcomponents execute on a single computer with a dual-headed graphics card and dual monitors. In another embodiment, the software-subcomponents execute on separate computers.

Figure 5A:
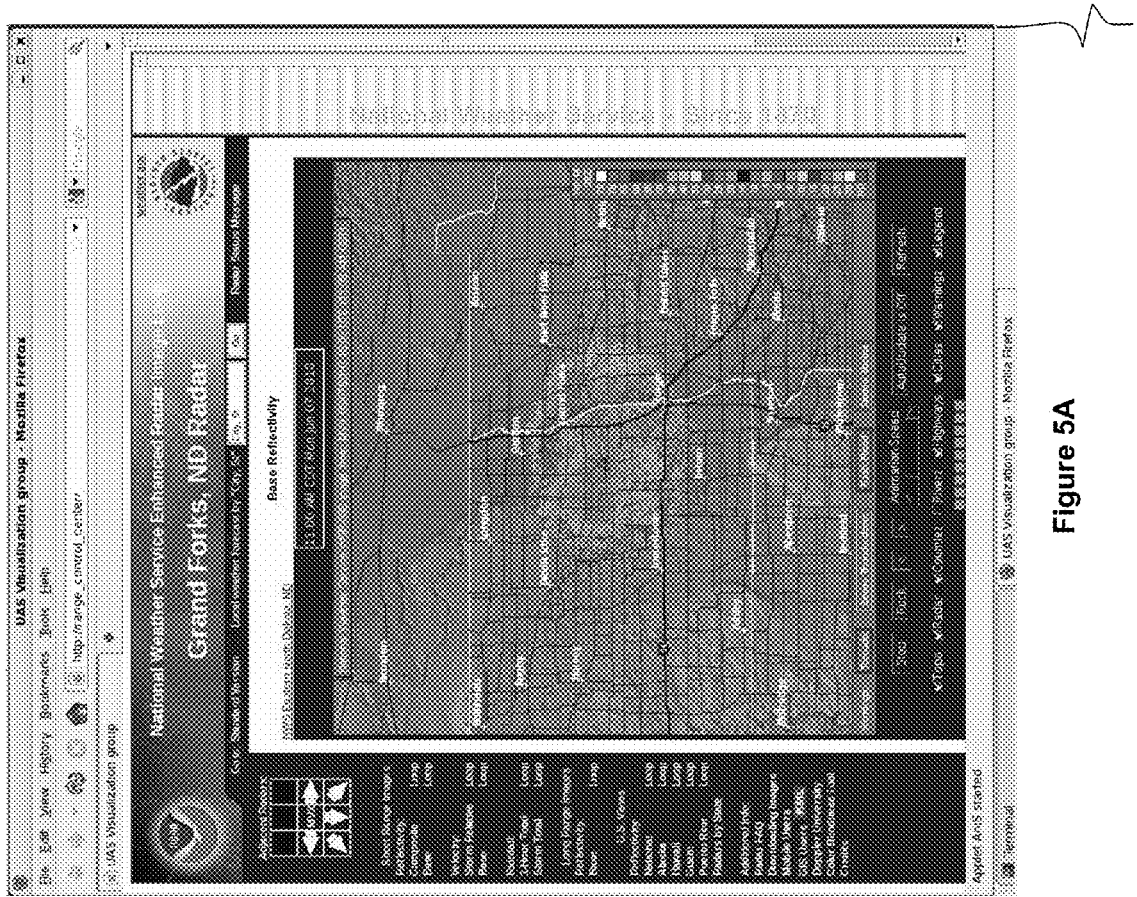
FIGS. 5A and 5B are partial views of an example screen shot from a Doppler Weather Radar display, with FIG. 5A being a left-hand portion of the view and FIG. 5B being a right-hand portion of the view.
Figure 5B:
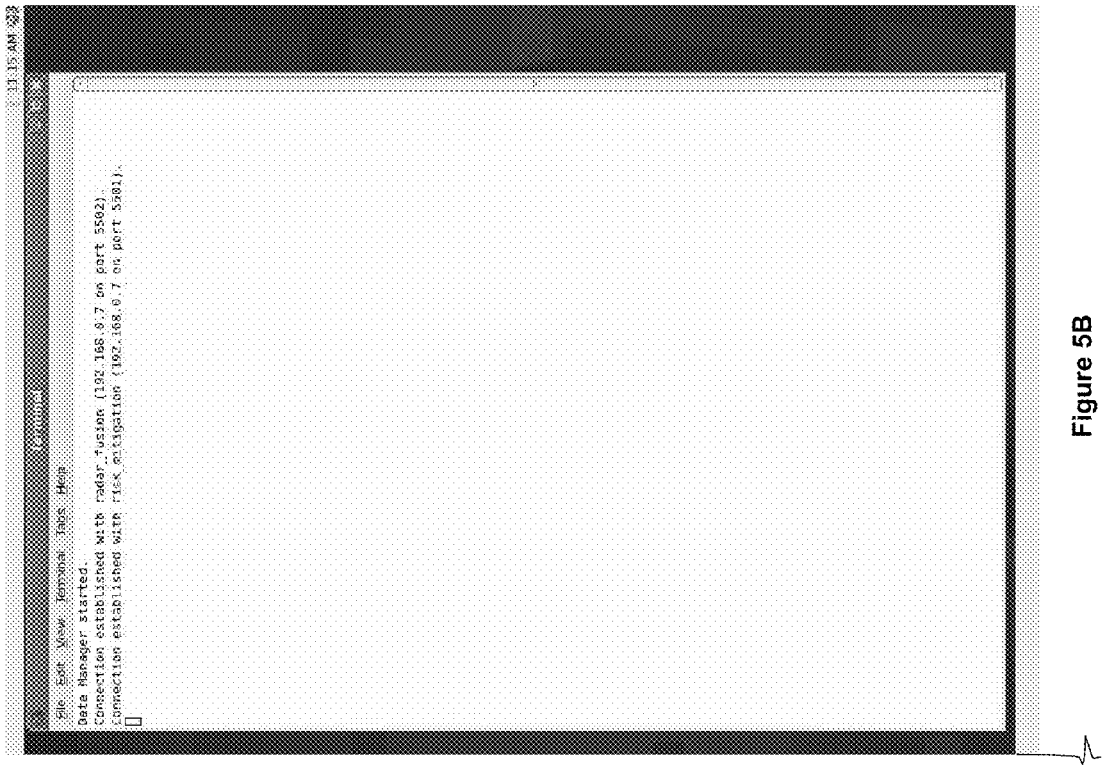

The Weather Radar Display 6 includes a Web Browser 6a set to periodically receive Doppler weather radar data from a Weather Radar 9 source, such as the National Weather Service website, and a Display 6b. An example screen shot of Display 6b is shown in FIGS. 5A and 5B.

Figure 6A:
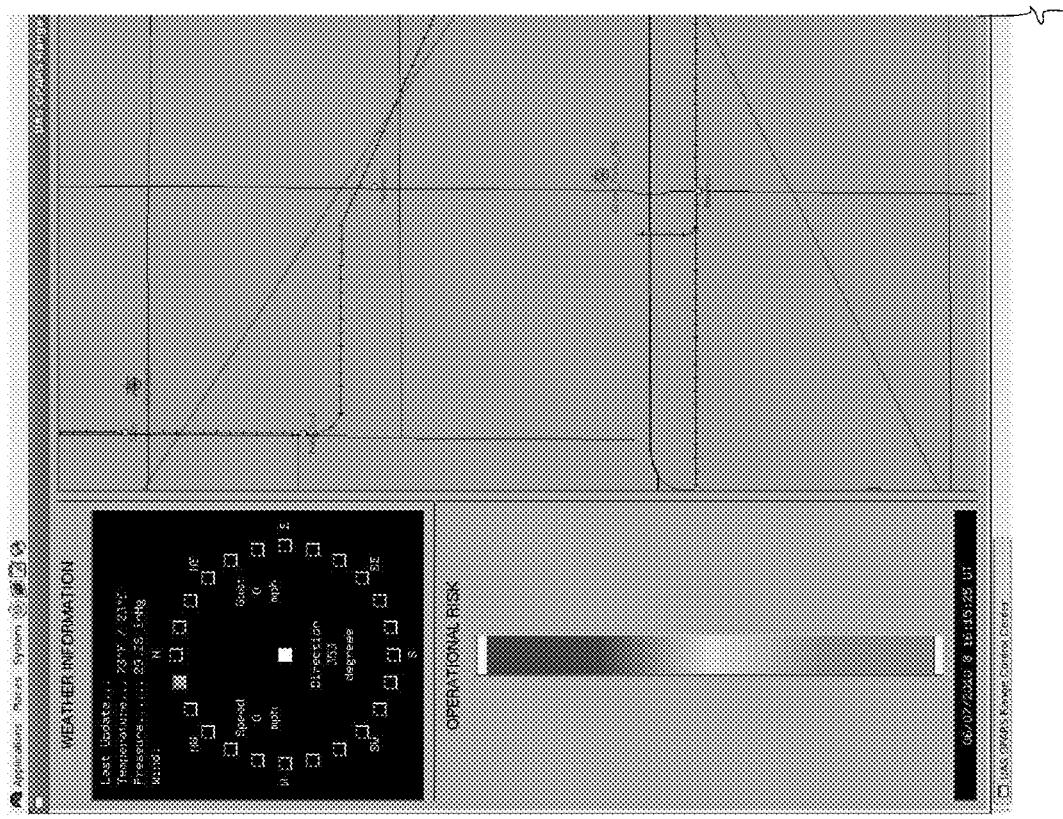
FIGS. 6A and 6B are partial views of an example screen shot from a Range Control Center Information Display System, with FIG. 6A being a left-hand portion of the view and FIG. 6B being a right-hand portion of the view.
Figure 6B:
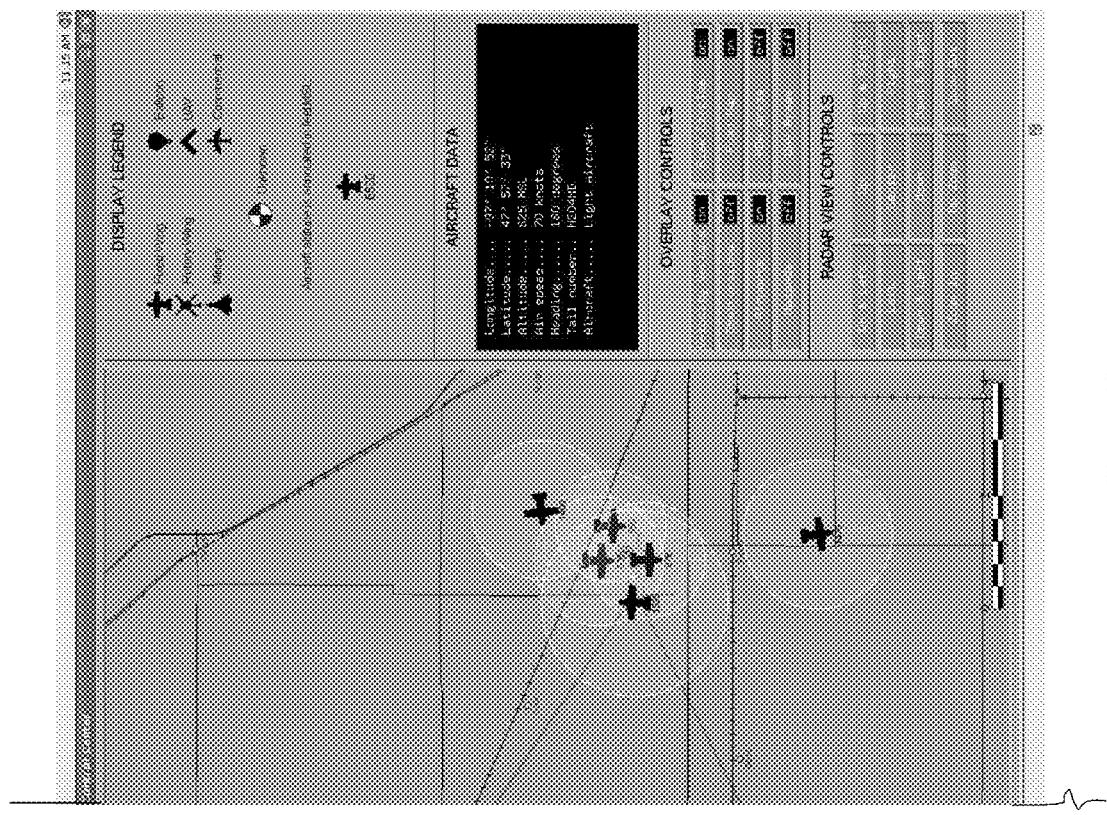

The RCCIDS 7 comprises a Data Polling Thread 7a and a Display 7b. The Data Polling Thread 7a monitors the Ethernet port for data being broadcast using the multicast IP address. As each block of data is received it is checked for errors using a checksum calculation. The data are then passed to the Display 7b where they are graphically rendered. In one embodiment, the Display 6b and Display 7b share a single a 20 inch wide high resolution monitor (not specifically shown); however, any type of display or computer or combination thereof may be used. The Display 7b, an example screen shot of which is shown in FIGS. 6A and 6B, is modeled after existing Air Traffic Control (ATC) display systems, Traffic Information Service-Broadcast (TIS-B) display systems, and Flight Information Service - Broadcast (FIS-B) display systems. From left to right, the embodiment of the Display 7m shown in FIGS. 6A and 6B displays the following:

Weather information displayed in text form includes temperature, barometric pressure, wind speed, and wind gusts. Wind direction is graphically displayed. Information displayed is that acquired from the Weather Station 8.

Below the weather information is the operational risk display. This display comprises a sliding arrow on a colored bar (green to red) indicating the risk associated (low to high) with the operations of the vehicle of interest in the airspace. Information displayed is generated from the risk parameter acquired from the Risk Mitigation Support System 3g.

In the screen center is the airspace display. The airspace display displays the georeferenced positions of all aircraft operating in the monitored airspace. This display is designed such that North is always up and aircraft icons are rotated in-place to show their specific headings. Aircraft altitudes are displayed below each aircraft icon. Each aircraft's ADS-B emitter category is used to classify the aircraft into one of six categories (fixed wing, rotary wing, military, balloon, UAV, and commercial). North Atlantic Treaty Organization (NATO) icons can be used for all georeferenced objects displayed: aircraft, radars, airports, towers, etc. A blue and white circular icon is used to signify unknown airborne objects such as non-cooperative aircraft. Information displayed is that acquired from the Airspace Data Fusion and Sensor Coordination System 3.

On the screen right side is a legend of all aircraft icons used in the airspace display (e.g., NATO aircraft icons).

Below the legend is a display of aircraft data (e.g., longitude, latitude, altitude, airspeed, heading, etc.) of any aircraft that is "moused-over," that is, selected by a user. Information displayed is that acquired from the Airspace Data Fusion and Sensor Coordination System 3.

Below aircraft data display is a set of buttons that enable/disable the display of georeferenced airspace overlays. Geographic information system (GIS) overlay data currently exists for political boundaries, roads, railroads, towns, high tension utility lines, schools, airports, and towers (e.g., TV/radio transmission and wind power generation) and Military Operations Areas (MOA's).

At the lower right is a set of buttons that control the airspace display itself. Options such as zoom, pan, and scroll are provided.

One embodiment of the display 7b uses OpenGL and a 24 inch wide high resolution monitor; however, any graphics API (e.g., Direct X, etc) and/or any type of computer may be used.

The second IDS is the Ground Observer Information Display System (GOIDS) 11. The GOIDS 11 monitors the multicast output stream produced by the Airspace Data Fusion and Sensor Coordination System 3 and presents relevant airspace information to the Ground Observer 12.

Figure 7A:
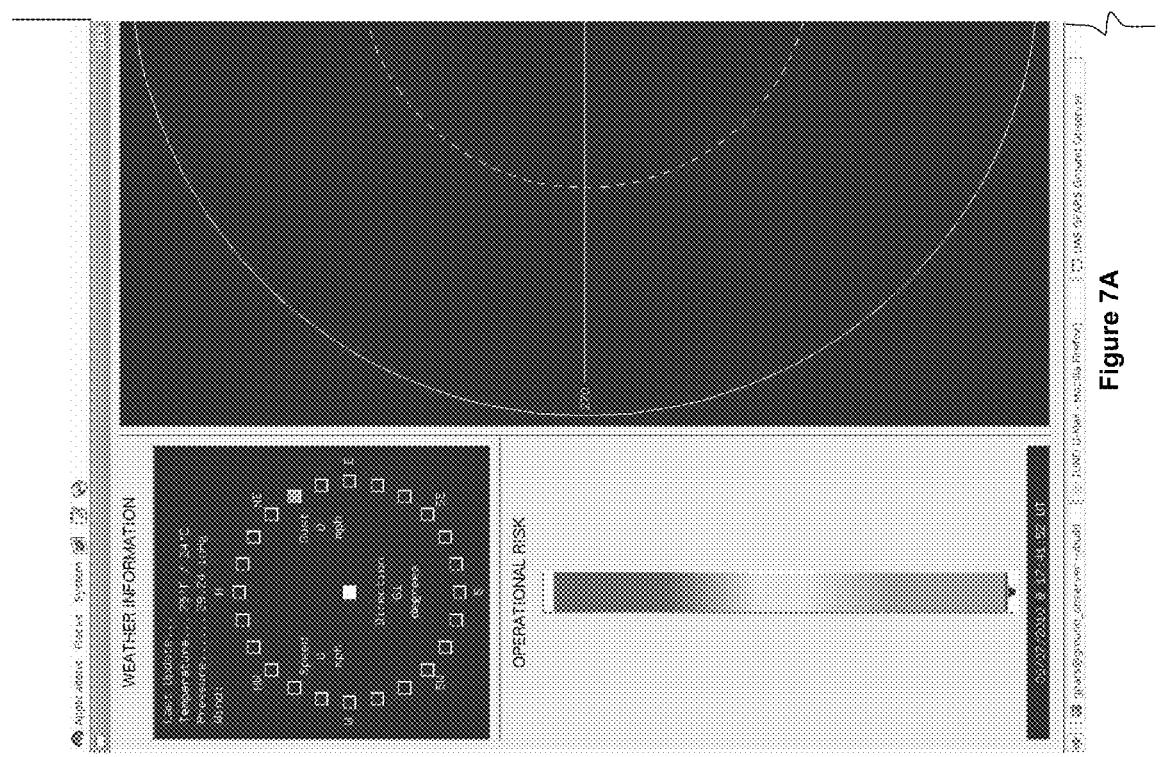
FIGS. 7A and 7B are partial views of an example screen shot from a Ground Observer Information Display System, with FIG. 7A being a left-hand portion of the view and FIG. 7B being a right-hand portion of the view.
Figure 7B:
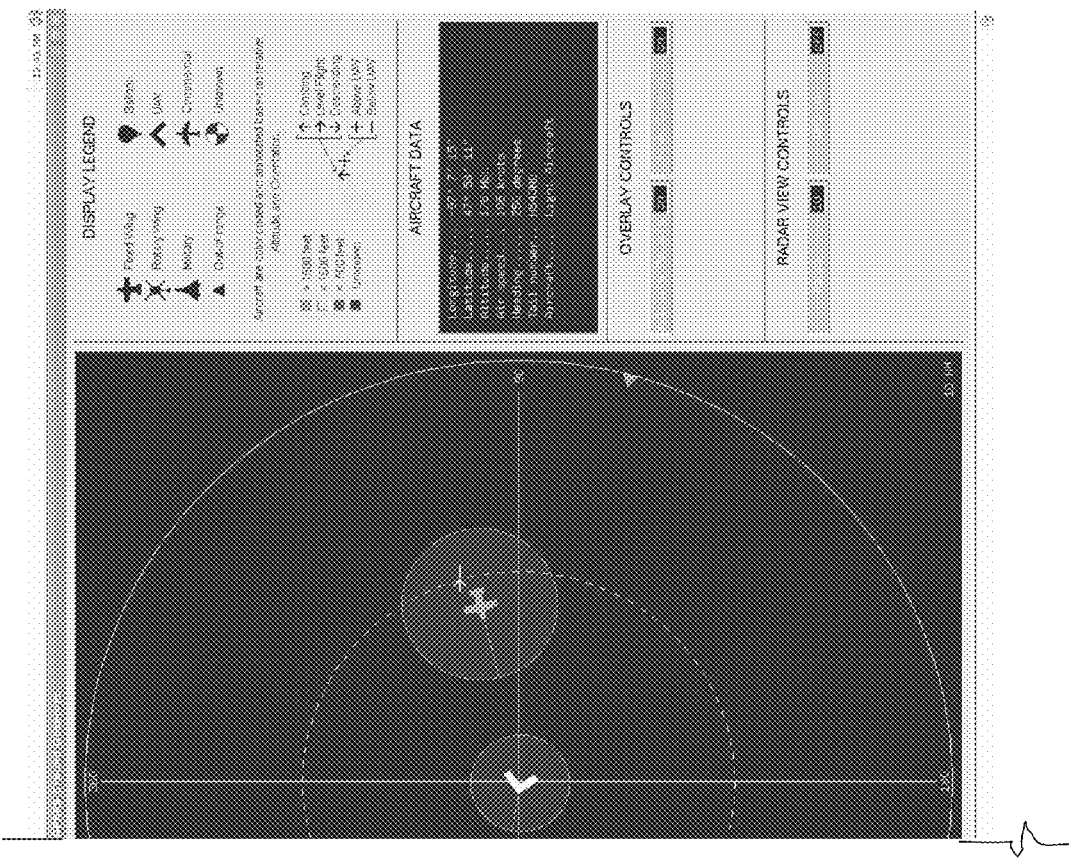

The GOIDS 11 comprises a Data Polling Thread 11*a* and a Display 11*b*. The Data Polling Thread 11*a* monitors the Ethernet port for data being broadcast using the multicast IP address. As each block of data is received it is checked for errors using a checksum calculation. The data are then passed to the Display 11*b* where they are graphically rendered. The Display 11*b*, an example screen shot of which is shown in FIGS. 7A and 7B, is modeled after existing Automatic Dependent Surveillance - Broadcast (ADS-B) cockpit display systems. From left to right, the embodiment of the Display 11*b* shown in FIGS. 7A and 7B displays the following:

Weather information displayed in text form includes temperature, barometric pressure, wind speed, and wind gusts. Wind direction is graphically displayed. Information displayed is that acquired from the Weather Station 8.

Below the weather information is the operational risk display. This display comprises a sliding arrow on a colored bar (green to red) indicating the risk associated (low to high) with the operations of the vehicle of interest in the airspace. Information displayed is generated from the risk parameter acquired from the Risk Mitigation Support System 3*g*.

In the center of the screen is an airspace display. This airspace display shows aircraft in relation to the vehicle (UA) of interest. The vehicle of interest is always centered in the display with its heading pointing up or optionally with North pointing up. As the vehicle of interest changes its heading, the display is rotated to maintain the proper upward orientation of the vehicle of interest. There are three sets of icons used in the display. The always centered vehicle of interest icon is the icon (e.g., NATO aircraft icon) for a UA. Colored aircraft icons (icon usage can be the same as with the RCCIDS) indicate air traffic that is within the user selected range for the display. Colored triangles indicate air traffic that is outside the user selected range for the display. The icon's color can indicate the aircraft's relative altitude with respect to the vehicle of interest. For instance, green indicates that the aircraft's altitude is more than ±1500 feet different than the vehicle of interest. Yellow indicates that the aircraft's altitude is between ±1500 feet and ±500 feet different than the vehicle of interest. Red indicates that the aircraft's altitude is less than ±500 feet different than the vehicle of interest. Next to the aircraft icons are additional symbols that indicate whether the aircraft is ascending or descending and if the aircraft is above or below the aircraft of interest. A blue and white circular icon can be used to signify unknown airborne objects such as non-cooperative aircraft. A blue triangle can be used to indicate such objects when they are outside the display range. Information displayed is that acquired from the Airspace Data Fusion and Sensor Coordination System 3.

On the screen right side is a legend of all aircraft icons used in the airspace display (e.g., NATO aircraft icons).

Below the legend is a display of aircraft data (longitude, latitude, altitude, airspeed, heading, etc.) of any aircraft that is "moused-over," that is, selected by a user. Information displayed is that acquired from the Airspace Data Fusion and Sensor Coordination System 3.

At the lower right is a set of buttons that control the airspace display itself. Options such as range-adjust (zoom), enable/disable UA track display, and enable/disable velocity vector display are provided.

One embodiment of the display 11*b* uses OpenGL and a 24 inch wide high resolution monitor; however, any graphics API (e.g., Direct X, etc) and/or any type of computer may be used.

There are several benefits to using a multicast approach for the delivery of information to the information display systems. For instance, use of a multicast approach allows the system to be expandable to any number of vehicles of interest and any number of associated information display systems without any architectural or software changes. As long as each vehicle of interest can be uniquely identified by either ADS-B transmissions or the telemetry stream, a GOIDS 11 can be assigned to each unique vehicle. Lastly, use of a multicast approach also increases the probability that all information display systems connected to the network will be displaying the same data at any instant. Additional features and benefits will be apparent to those of ordinary skill in the art.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airspace risk mitigation system comprising:
a plurality of airspace input sources comprising:
a first radar for generating radar data for an airspace; and
an Automatic Dependent Surveillance-Broadcast (ADS-B) receiver for generating additional data for the airspace;
an airspace data fusion and sensor coordination system configured to receive airspace data from the plurality of airspace input sources, correlating airspace data with new or known objects in the airspace, and fusing airspace data into a common airspace data set, wherein the airspace data fusion and sensor coordination system generates target and system status information;
a communications link for communicating between at least one of the plurality of airspace input sources and the airspace data fusion and sensor coordination system; and
a risk mitigation support system configured to calculate a risk associated with aircraft operation in the airspace as a function of the target and system status information, wherein the risk mitigation support system is further configured to determine an interaction volume of a manned aircraft in the airspace as a function of expected maneuverability parameters of the manned aircraft in the airspace.

2. The system of claim 1 and further comprising:
a display for displaying an output indicative of the risk associated with aircraft operation in the airspace.

3. The system of claim 1, the plurality of airspace input sources further comprising:
a weather station for providing weather information related to the airspace, wherein weather events are treated as objects.

4. The system of claim 1, wherein the risk associated with aircraft operation in the airspace is calculated using a Monte Carlo simulation.

5. The system of claim 4, wherein the risk associated with aircraft operation in the airspace is calculated using a probability formula derived from the Monte Carlo simulation that provides a probability of interaction in the airspace as a function of one or more discrete variables.

6. The system of claim 5, wherein the risk associated with aircraft operation in the airspace is calculated using a data accuracy adjustment, applied as location errors associated with each object in the airspace that increase or decrease the probability of interaction.

7. The system of claim 5, wherein the risk associated with aircraft operation in the airspace is calculated by fitting discrete data determined from the Monte Carlo simulation to a smoothly varying function applied to generate the probability of interaction.

8. The system of claim 5, wherein the risk associated with aircraft operation in the airspace is calculated using interpolation of one or more data tables determined from the Monte Carlo simulation applied to generate the probability of interaction.

9. The system of claim 1, wherein the risk mitigation support system is configured as a subsystem of the airspace data fusion and sensor coordination system.

10. The system of claim 1, wherein the risk mitigation support system represents the interaction volume of the manned aircraft within the common airspace as a three-dimensional cone.

11. The system of claim 1, wherein the expected maneuverability parameters include at least one of limits to pitch and banked turns.

12. A computer-implemented method of calculating a risk associated with aircraft operation within an airspace, the method comprising:
   obtaining airspace input data from a plurality of data sources in computer-readable format;
   identifying objects in the airspace as a function of the airspace input data;
   determining an interaction volume of a manned aircraft objects in the airspace as a function of one or more expected maneuverability parameters of the manned aircraft object in the airspace; and
   conducting a Monte Carlo simulation using one or more processors to provide a probability of interaction for each of the identified objects in the airspace, including the manned aircraft objects as a function of the airspace input data.

13. The method of claim 12 and further comprising:
   fitting discrete data determined from the Monte Carlo simulation to a smoothly varying function to generate the probability of interaction.

14. The method of claim 12 and further comprising:
   interpolating one or more data tables determined from the Monte Carlo simulation to generate the probability of interaction.

15. The method of claim 12 and further comprising:
   performing a data accuracy adjustment using location errors associated with each object in the airspace that increase or decrease the probability of interaction.

16. The method of claim 12 and further comprising:
   representing the interaction volume of the one or more manned aircraft objects as a three-dimensional cone.

* * * * *